(12) United States Patent
Kofoed

(10) Patent No.: US 7,080,798 B2
(45) Date of Patent: Jul. 25, 2006

(54) TWIN SCREW PUMP FOR FLOWABLE SOLIDS WITH OVERLOAD PROTECTION

(75) Inventor: Niels Peter Kofoed, Tølløse (DK)

(73) Assignee: CFS Slagelse A/S, Slagelse (DK)

( * ) Notice: Subject to any disclaimer, the term of this patent is extended or adjusted under 35 U.S.C. 154(b) by 51 days.

(21) Appl. No.: 10/483,296

(22) PCT Filed: Jul. 10, 2002

(86) PCT No.: PCT/DK02/00481

§ 371 (c)(1),
(2), (4) Date: Jun. 8, 2004

(87) PCT Pub. No.: WO03/006348

PCT Pub. Date: Jan. 23, 2003

(65) Prior Publication Data

US 2004/0211647 A1    Oct. 28, 2004

(30) Foreign Application Priority Data

Jul. 12, 2001   (DK) ............................... 2001 01089

(51) Int. Cl.
*B02C 18/30* (2006.01)
(52) U.S. Cl. .................................... 241/82.5
(58) Field of Classification Search ...... 241/82.1–82.7, 241/260.1
See application file for complete search history.

(56) References Cited

U.S. PATENT DOCUMENTS 3,112,525 A * 12/1963 Moziek ...................... 425/185
4,153,208 A * 5/1979 Vomhof et al. ............ 241/82.4
5,472,319 A    12/1995 Rohlfing
2002/0059836 A1    5/2002 Dodsworth

FOREIGN PATENT DOCUMENTS

DE          003915409 A1 *  11/1990

* cited by examiner

*Primary Examiner*—Mark Rosenbaum
(74) *Attorney, Agent, or Firm*—Douglas E. Jackson; Stites & Harbison PLLC

(57) ABSTRACT

The invention discloses a screw conveyor for the transport of flowable substances and/or lumps of material, comprising a rotatable first screw (1) provided with helical windings (2) arranged in a housing (3) with an inlet opening and an outlet opening, said housing (3) comprising an inlet chamber (4) and a pumping chamber (5) between said inlet and outlet openings and at least in the pumping chamber (5) comprising a second screw (6) provided with helical windings (7) and arranged for rotation in the opposite direction of the first screw (1), said screws (1, 6) in said pumping chamber (5) providing a positive displacement pumping function by mutual engagement between the two screws (1, 6) when said rotatable first screw (1) is rotated in a first sense of rotation, and furthermore provided with a cutting device (10, 11) downstream of the pumping chamber and housed within a knife house (13) comprising an internal channel (21), where said knife house (13) is connected to said outlet opening of the screw conveyor. By providing said knife house (13) with second outlet means for receiving at least a portion of said substances and/or materials provided to the knife house (13) from said pumping chamber (5) overfilling of the knife house (13) is prevented. As an alternative means for varying the internal volume of the knife house (13) may be used.

5 Claims, 3 Drawing Sheets

TWIN SCREW PUMP FOR FLOWABLE SOLIDS WITH OVERLOAD PROTECTION

TECHNICAL FIELD

The present invention relates to a screw conveyor for the transport of flowable substances and/or material having: a rotatable first screw provided with helical windings arranged in a housing with an inlet opening and an outlet opening, the housing including an inlet chamber and a pumping chamber between the inlet and outlet openings; at least in the pumping chamber, a second screw provided with helical windings and arranged for rotation in an opposite direction of the first screw, the first and second screws in the pumping chamber providing a positive displacement pumping function by mutual engagement between the first and second screws when the rotatable first screw is rotated in a first sense of rotation; and a cutting device downstream of the pumping chamber and housed within a knife house, the cutting device including an internal channel, where the knife house is connected to the outlet opening.

BACKGROUND OF THE INVENTION

A screw conveyor for the transport of flowable substances and/or material as referred to initially may be used in connecting with meat-mincing machines, but it could also be used in other constructions, in which flowable substances are to be pumped by a positive displacement pumping function. Special problems arise, however, if the flow of substances has to be interrupted (periodically), for instance if the screw conveyor is used for carrying out filling operations in sausage manufacturing. In this application a clip device is coupled to the outlet from the screw conveyor so that the otherwise continues flow of substance through the outlet from the conveyor is periodically interrupted. This interruption may cause problems with overfilling of the pumping chamber in the conveyor and it has been known to solve this problem by stopping the conveyor during the clipping period.

DISCLOSURE OF THE INVENTION

It is an object of the present invention to provide a screw conveyor in which overfilling of the pumping chamber—and associated knife house—during the above mentioned interruptions of continuos flow of substance through the outlet section of the conveyor can be avoided without the necessity to stop the rotation of the pump screws in the screw conveyor entirely during periods of interruption of continuos flow of substance, such as during the clipping periods referred to above in connection with the manufacturing of sausages or similar products.

According to the invention these and other objects are attained with a screw conveyor as set forth hereafter. Various embodiments of the invention are also defined hereafter.

According to the present invention there is thus provided a screw conveyor for the transport of flowable substances and/or lumps of material, comprising a rotatable first screw provided with helical windings arranged in a housing with an inlet opening and an outlet opening, said housing comprising an inlet chamber and a pumping chamber between said inlet and outlet openings, and at least in the pumping chamber comprising a second screw provided with helical windings and arranged for rotation in the opposite direction of the first screw, said screws in said pumping chamber providing a positive displacement pumping function by mutual engagement between the two screws when said rotatable first screw is rotated in a first sense of rotation, and furthermore provided with a cutting device downstream of the pumping chamber and housed within a knife house, where said knife house is connected to said outlet opening of the screw conveyor, and where said knife house is provided with second outlet means for receiving at least a portion of said substances and/or materials provided to the knife house from said pumping chamber.

As an alternative to the above second outlet means from the knife house the knife house is provided with a displaceable member—such as a piston—which in one position occupies a certain portion of the internal volume of the knife house and which when activated for instance at the time of interruption of said continuos flow of substance is displaced outwardly from the volume of the knife house, thereby increasing this volume and thus counteracting the tendency to overfilling the knife house during the interruption of the flow.

BRIEF DESCRIPTION OF THE DRAWINGS

The invention will now be described in more detail with reference to the accompanying drawings, in which.

DETAILED DESCRIPTION OF THE INVENTION

In the following a detailed description of two embodiments of the present invention is given.

Figure 1:
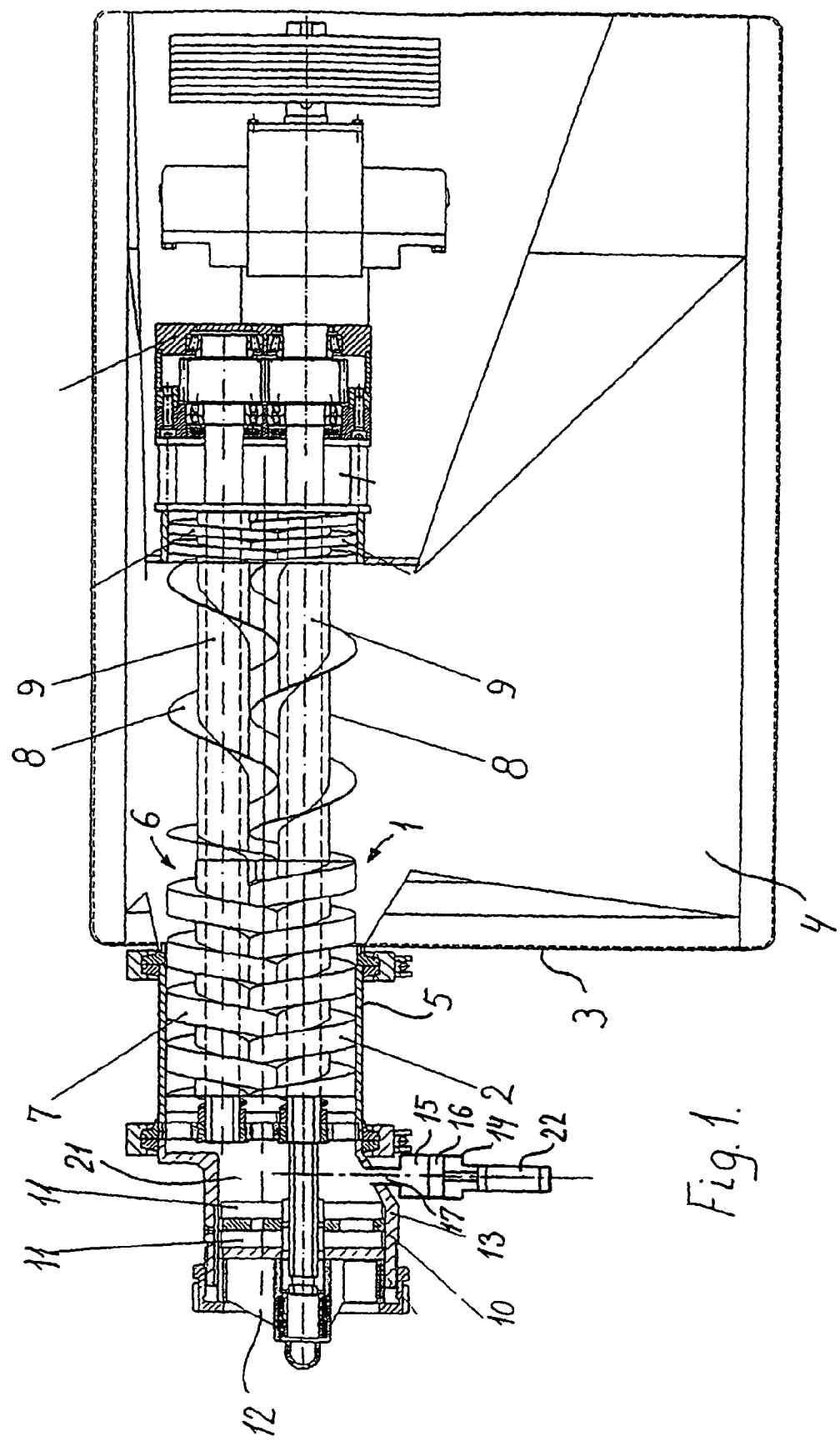
FIG. 1 is a cross sectional view of a first embodiment of the invention where the knife house is provided with a buffer valve mechanism with associated actuator.

With reference to FIG. 1 there is shown a first embodiment of the screw conveyor according to the invention. More specifically there is shown a meat-mincing machine incorporating a screw conveyor and comprising an inlet chamber 4 into which the material to be handled is introduced and in the bottom of which two transport screws 8 are mounted to move the material towards a set of pumping screws 1, 6 provided with inter-engaging helical windings 2, 7. The pumping screws are mounted in a pumping chamber 5, whereby said screws 1, 6 and pumping chamber 5 provides a positive displacement pumping function by the mutual engagement between the two screws 1, 6 inside the pumping chamber 5. The first screw 1, the second screw 6 and the transport screws 8 are mounted on common axles 9 for rotation by a drive gear and motor. The axles 9 are rotated in opposite directions and so are the screws 1, 6, 8 mounted on the axles 9. As shown the pumping screws 1, 6 extend approximately one and a half winding out of the pumping chamber 5 and into the inlet chamber 4.

The outlet from the pumping chamber 5 is connected to the inlet of the knife house 13 comprising a perforated disc 10 co-operating with a set of rotating knives 11 being rotated by the axle 9. The outlet from the pumping chamber 5 is connected to this cutting device by a relatively small volume channel 21 in order to reduce the amount of material left inside this volume when stopping the machine for cleaning/changing handled material.

As mentioned above in the disclosure of the invention a sudden interruption of flow of material out of the outlet 12 of the machine will cause an unwanted accumulation of material in the channel 21 and eventual malfunction of the machinery. In order to solve this problem the channel 21 is according to the first embodiment of the invention provided with a buffer valve system being able to accommodate a sufficient amount of material to prevent the problems of unacceptable accumulation of material in the channel 21. The buffer valve system is connected to the channel 21 via a small lateral passage 17 connected to a tubular member comprising a piston 16 operated by a suitable actuator means 22. When the flow of material through the outlet 12 is interrupted the actuator displaces the piston 15 in a direction away from the channel 21 thereby creating a volume 15 of sufficient size to be able to contain the amount of material which is being kept from leaving the knife house 13 through the outlet 12. The operation of the actuator means is controlled by means of appropriate sensing means that are able to sense the interruptions of the continuos flow of material through the outlet 12 together with appropriate hardware and software.

An advantageous effect of the operation of the buffer valve system as described above is that it upon activation lessens the pressure exerted on the skin or casing of a sausage during the clip operation by creating a "vacuum" in the chamber 21, thereby reducing the risk of fractures of the skin of the sausage during the clip operation.

Using the buffer valve system according to this embodiment of the invention it is thus possible to obtain satisfactory operation of the machine during interruptions of continues flow without it being necessary to stop the rotation of the axles 9. In order to reduce to amount of material which must be accommodated by the volume 15 of the buffer valve it is however possible if desired to reduce the speed of rotation of the axles 9 during clip operations.

After termination of each of the clip operations—and controlled by said hardware/software—the piston 16 is returned to its initial position thereby returning the accommodated amount of material to the channel 21 and hence to the cutting means 10, 11.

Figure 2:
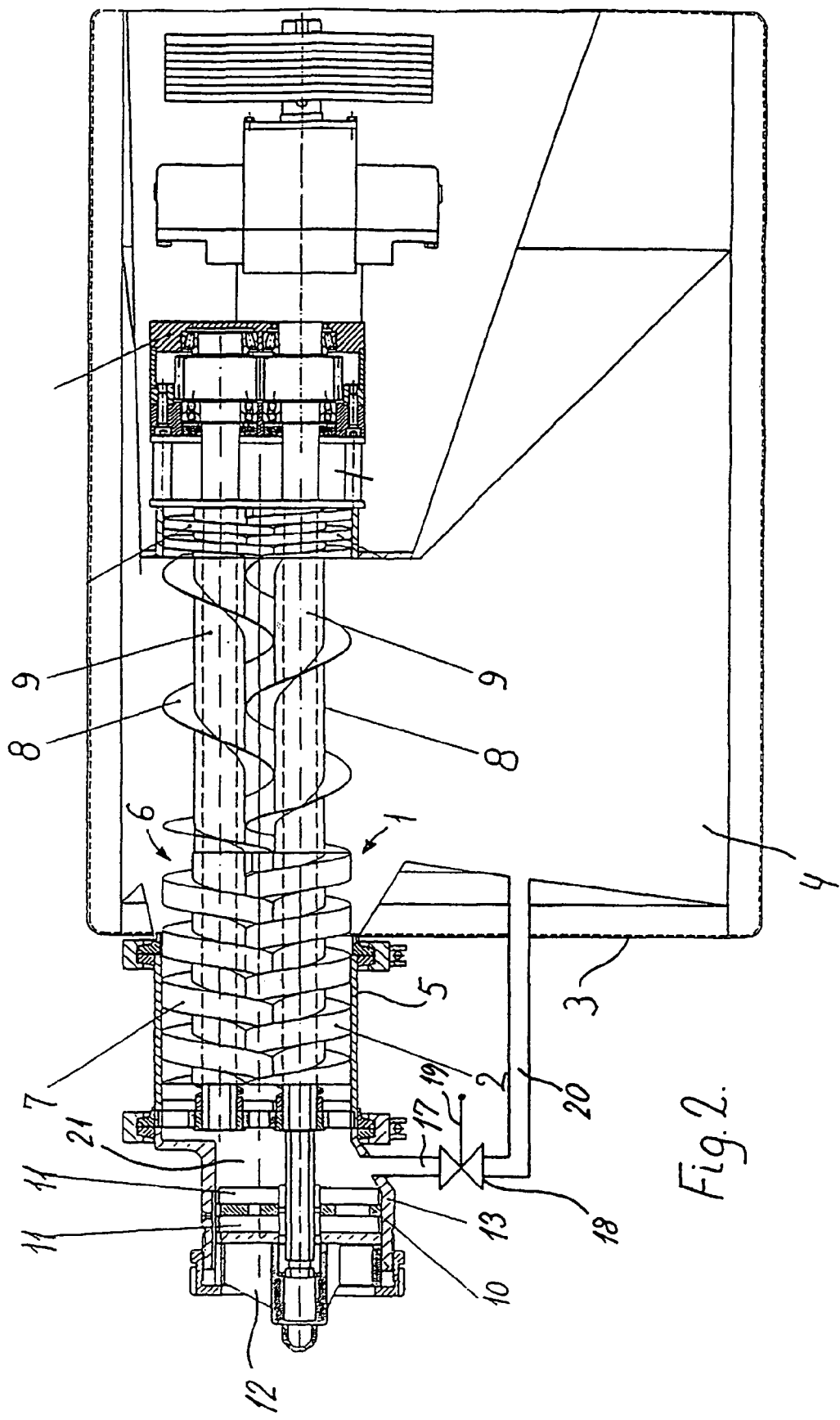
FIG. 2 is a cross sectional view of a second embodiment of the invention where the knife house is provided with a return channel from the interior volume of the knife house to the inlet chamber comprising a controllable valve.

Referring now to FIG. 2 there is shown a second embodiment of the screw conveyor according to the invention. According to this embodiment the knife house 13 is still provided with a passage 17 extending from the channel 21 as in the first embodiment. The buffer valve system is however replaced by a channel 20 providing communication between the channel 21 in the knife house 13 and back to the inlet chamber 4 via an appropriate controllable valve 18 which again can be controlled 19 by appropriate sensing means and hardware/software. This second embodiment of the invention would still solve the problem of making it unnecessary to stop rotation of the axles 9 during interruptions of substance flow through the outlet 12 but would not yield the possibly beneficial effect of providing "vacuum" to the channel 21 in the knife house 5 as described above.

Figure 3:
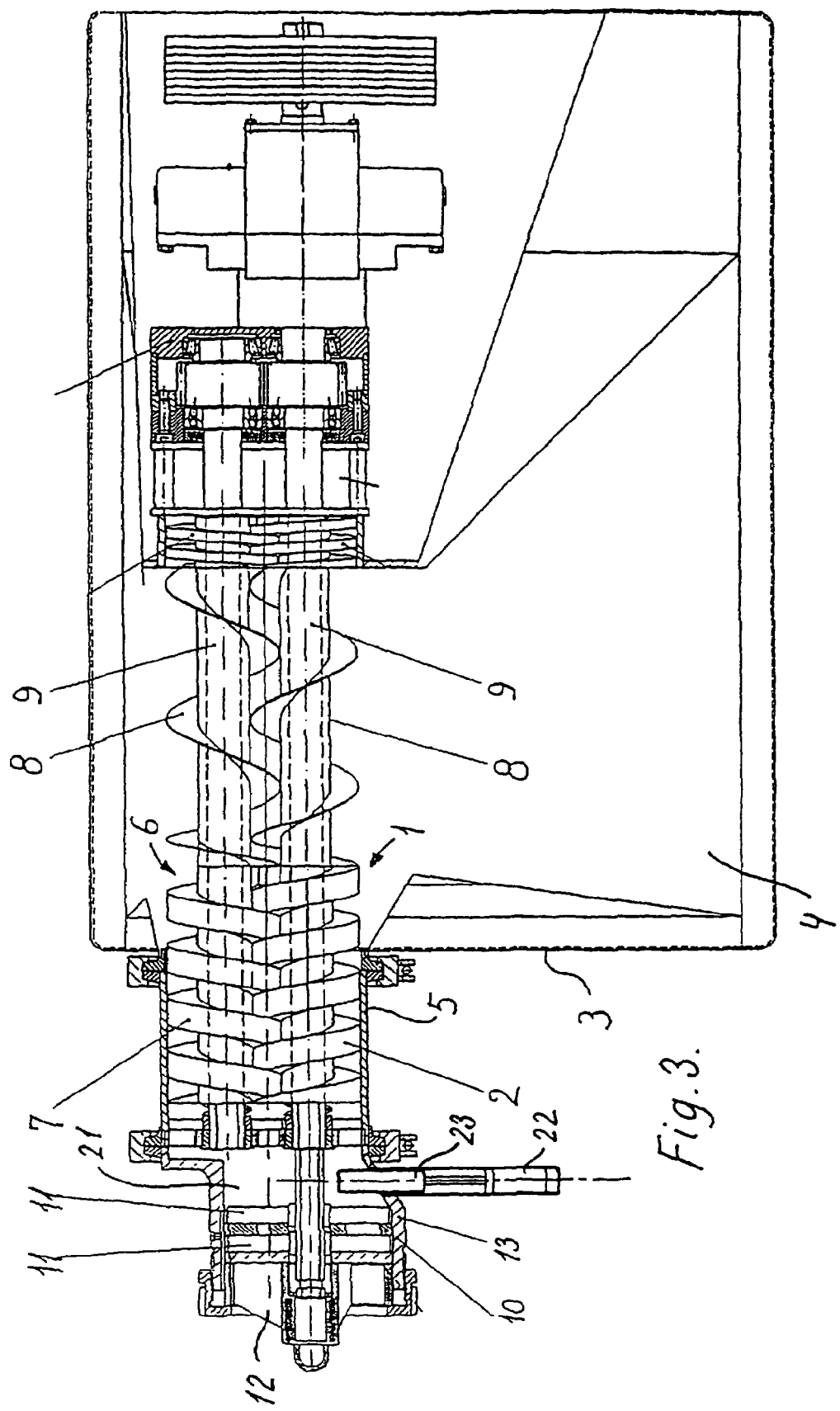
FIG. 3 is a cross sectional view of a third embodiment of the invention where the knife house is provided with a displaceable piston in one displacement state filling a portion of the interior volume of the knife house.

Referring now to FIG. 3 there is shown a third embodiment of the screw conveyor according to the invention. According to this embodiment the knife house 13 is provided with a displaceable piston 23 driven by the actuator 22. In the situation shown in FIG. 3 the piston 23 is displaced to a position where it occupies a portion of the channel 21 in the knife house 5, but when said interruption of the flow of material through the outlet 12 takes place the piston 23 is being displaced outwardly from the channel 21 driven by the actuator 22 in a manner similar to the piston 16 in the first embodiment of the invention shown in FIG. 1. By this outward displacement the volume of the channel 21 is increased, thus reducing the risk of overfilling of the channel 21, and if the displacement is carried out fast enough the increase of said volume during a short interval of time will exceed the volume of material provided to the channel 21 by the screws 1, 6 during this time interval, and a "vacuum" will be created as described above.

Finally as a completely alternative means compared to those described above the said "vacuum"—and generally an interruption of the positive displacement of material outwardly through the outlet 12—could be obtained by gradually reducing the speed of rotation of the axles 9 and finally reversing the sense of rotation of these during the clip operations.

Although various embodiments of the present invention have been shown and described in the preceding parts of the detailed description it is understood that a person skilled in the art may conceive other embodiments of the invention without departing from the scope of the invention as defined by the following claims.

The invention claimed is:

1. Screw conveyor for the transport of flowable substances and/or lumps of material, comprising:
   a rotatable first screw provided with helical windings arranged in a housing with an inlet opening and an outlet opening, said housing including an inlet chamber and a pumping chamber between said inlet and outlet openings;
   at least in the pumping chamber, a second screw provided with helical windings and arranged for rotation in an opposite direction of the first screw, said first and second screws in said pumping chamber providing a positive displacement pumping function by mutual engagement between the first and second screws when said rotatable first screw is rotated in a first sense of rotation;
   a cutting device downstream of the pumping chamber and housed within a knife house, said cutting device including an internal channel, where said knife house is connected to said outlet opening;
   wherein said knife house is provided with second outlet means for receiving at least a portion of said substances and/or materials provided to the knife house from said pumping chamber; and
   wherein said second outlet means comprises a passage leading from said knife house to a controllable buffer valve which upon activation is able to accommodate said portion of substance and/or material and upon a subsequent activation is able to supply said substance and/or material back to the knife house.

2. Screw conveyor for the transport of flowable substances and/or lumps of material, comprising:
   a rotatable first screw provided with helical windings arranged in a housing with an inlet opening and an outlet opening, said housing including an inlet chamber and a pumping chamber between said inlet and outlet openings;
   at least in the pumping chamber, a second screw provided with helical windings and arranged for rotation in an opposite direction of the first screw, said first and second screws in said pumping chamber providing a positive displacement pumping function by mutual engagement between the first and second screws when said rotatable first screw is rotated in a first sense of rotation;
   a cutting device downstream of the pumping chamber and housed within a knife house, said cutting device including an internal channel, where said knife house is connected to said outlet opening;

wherein said knife house is provided with second outlet means for receiving at least a portion of said substances and/or materials provided to the knife house from said pumping chamber; and wherein said second outlet means comprises a passage from said knife house back to said inlet chamber in which said passage there is a controllable valve.

3. Screw conveyor for the transport of flowable substances and/or lumps of material, comprising:

a rotatable first screw provided with helical windings arranged in a housing with an inlet opening and an outlet opening, said housing including an inlet chamber and a pumping chamber between said inlet and outlet openings;

at least in the pumping chamber, a second screw provided with helical windings and arranged for rotation in an opposite direction of the first screw, said first and second screws in said pumping chamber providing a positive displacement pumping function by mutual engagement between the first and second screws when said rotatable first screw is rotated in a first sense of rotation;

a cutting device downstream of the pumping chamber and housed within a knife house, said cutting device including an internal channel, where said knife house is connected to said outlet opening;

wherein said knife house is provided with second outlet means for receiving at least a portion of said substances and/or materials provided to the knife house from said pumping chamber; and wherein said second outlet means are being provided by reversing the direction of rotation of said first and second screws whereby at least a portion of said substance and/or material present in the knife house is removed from the knife house via said screws.

4. Screw conveyor for the transport of flowable substances and/or lumps of material, comprising:

a rotatable first screw provided with helical windings arranged in a housing with an inlet opening and an outlet opening, said housing including an inlet chamber and a pumping chamber between said inlet and outlet openings;

at least in the pumping chamber, a second screw provided with helical windings and arranged for rotation in an opposite direction of the first screw, said first and second screws in said pumping chamber providing a positive displacement pumping function by mutual engagement between the first and second screws when said rotatable first screw is rotated in a first sense of rotation;

a cutting device downstream of the pumping chamber and housed within a knife houses, said cutting device including an internal channel, where said knife house is connected to said outlet opening; and wherein said knife house is provided with means for varying a volume of said internal channel of the knife house.

5. Screw conveyor according to claim 4, wherein said means for varying the volume of said internal channel comprises a piston which is displaced out of or into said channel by an actuator.

* * * * *